Aug. 3, 1954

O. WITTEL ET AL 2,685,415

REVERSIBLE DRIVE FOR REELS

Filed Jan. 25, 1951

OTTO WITTEL
VERNON H JUNGJOHANN
Inventors

Daniel J. Mayne
J. Griffin Little
Attorneys

By

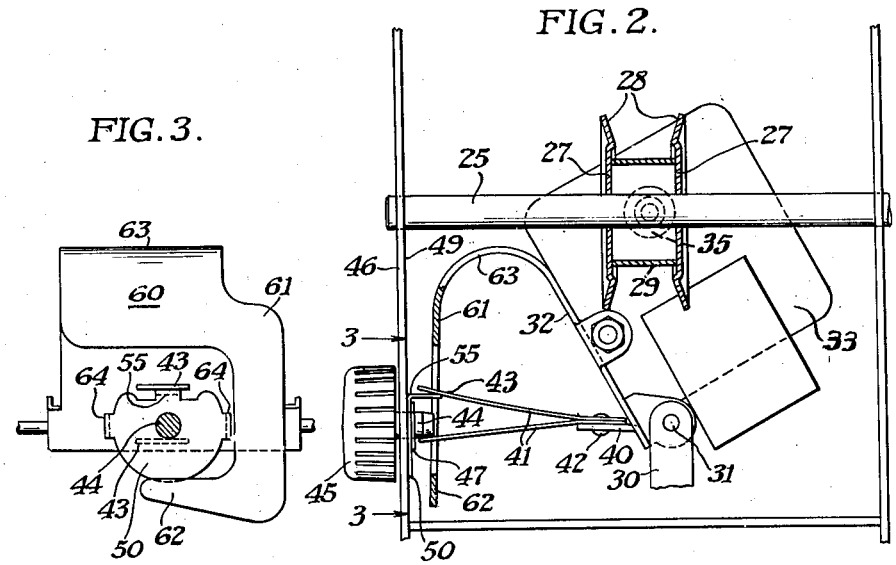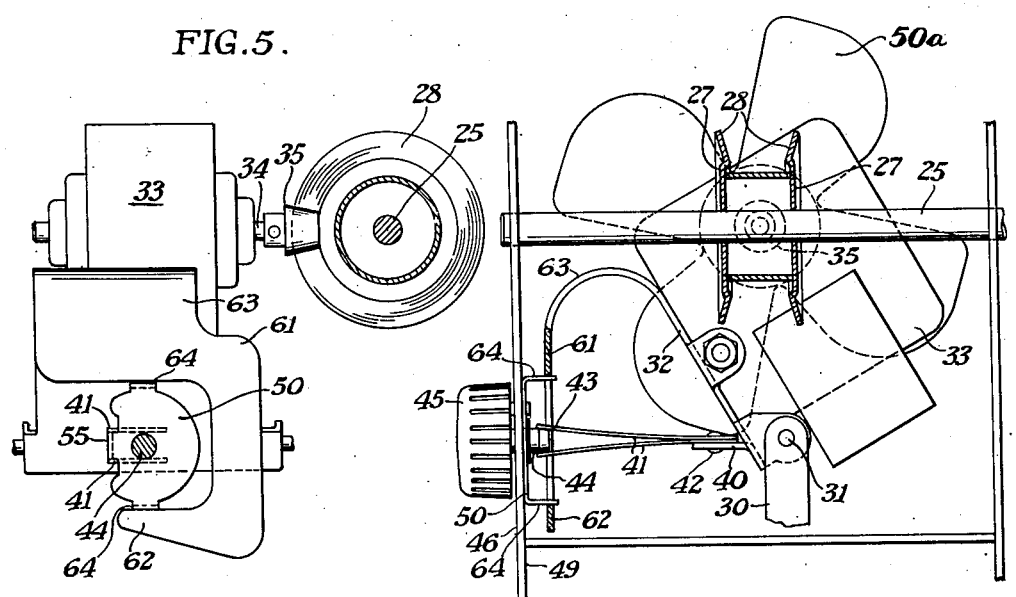

Patented Aug. 3, 1954

2,685,415

UNITED STATES PATENT OFFICE 2,685,415

REVERSIBLE DRIVE FOR REELS

Otto Wittel and Vernon H. Jungjohann, Rochester, N. Y., assignors to Eastman Kodak Company, Rochester, N. Y., a corporation of New Jersey Application January 25, 1951, Serial No. 207,750

5 Claims. (Cl. 242—55)

The present invention relates to a web or film feeding means, and more particularly to a film feeding means for a projector.

As is well known, most such projectors are provided with a supply spindle on which is positioned a supply reel to receive the film to be projected. The film is unwound from the supply reel; and, after passing through the film gate, is wound up on a take-up reel mounted on the take-up spindle. During normal projection, a drive means is connected to the take-up spindle to drive the latter to wind up the projected film, the supply reel idling during such winding. During reversing or rewinding, however, the drive means is disconnected from the take-up spindle and is connected to the supply spindle to drive the latter to rewind the film back onto the supply reel, the take-up reel and spindle idling during this rewinding. Accordingly, it has been common practice to connect and disconnect the supply and take-up reels selectively to the drive means of the projector so that the proper spindle and reel will be driven.

The present invention has as its principal object a new and simplified reversible drive means for a projector.

A further object of the invention is the provision of a drive means which may be connected positively and selectively to the desired spindle to move the film in the proper direction.

Yet another object of the invention is the provision of a reversible drive means which is simple in construction, comprises few parts of rugged construction, simple and easy to operate and highly effective in use.

Yet another object of the invention is the provision of an interlocking arrangement which will maintain the drive means in its disconnected relation during shipping and handling.

To these and other ends, the invention idea resides in certain improvements and combinations of parts, all as will be hereinafter more fully described, the novel features being pointed out in the claims at the end of the specification.

In the drawings:

Fig. 2 is a front elevation of the drive means, showing the relation of the parts when one reel is being driven, for the purpose of clarity the motor cooling propeller has been omitted.

Fig. 3 is a vertical sectional view taken substantially on line 3—3 of Fig. 2, showing the relation of the cam on the control knob to the actuating springs connected to the motor;

Fig. 4 is a view similar to Fig. 2, but showing the drive roller in its neutral position so as to disconnect both reels, and the actuating cam positioned to lock the motor against rocking movement about its pivot;

Fig. 5 is a side elevation view of the mechanism illustrated in Fig. 4, showing the relation of the parts when the motor is locked.

Fig. 6 is a fragmentary view, showing the relation of the drive roller and the driven discs with the roller in driving relation with one of the discs;

Similar reference numerals throughout the various views indicate the same parts.

Figure 1:
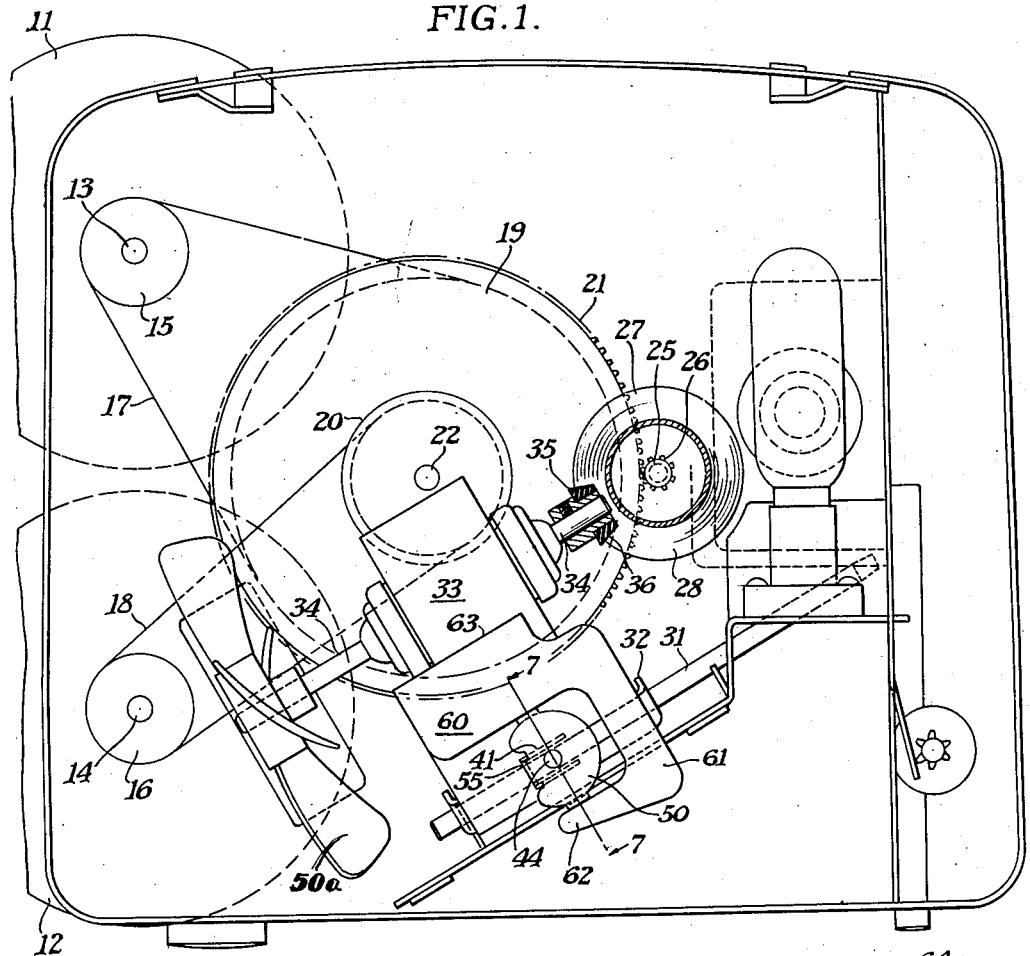
Fig. 1 is a side elevation view of a portion of a projector, showing the relation thereto of a drive means constructed in accordance with the present invention.

Fig. 1 of the drawings shows an upper supply reel 11 and a lower take-up reel 12 mounted on supply and take-up spindles 13 and 14 respectively. The spindles 13 and 14 have mounted thereon pulleys 15 and 16 which are connected by belts 17 and 18 to pulleys 19 and 20 formed on or connected to a gear 21 mounted on shaft 22. The spindles 13 and 14 have associated therewith one-way clutches, not shown, of any suitable and well known construction, which are so arranged that when gear 21 and pulleys 19 and 20 are rotated in one direction, one of the spindles will be connected through the clutch and will be driven, while the other one-way clutch will disconnect the other spindle, and the latter will idle. However, when the gear 21 and its associated pulleys are rotated in the opposite direction, the previously connected spindle will be disconnected and will idle, while the other spindle will be connected through its one-way clutch and will be driven. Thus, the rotation of the gear in either direction will serve to drive only one of the spindles 13 or 14, the particular spindle being driven depending on the direction of rotation of gear 21. In normal operation, the gear 21 is rotated so as to connect the spindle 14 to the gear to drive the take-up reel to wind up the projected film. However, during reversing or rewinding, the spindle 14 idles, and the spindle 13 is driven to rewind the film onto reel 11, all of which is deemed apparent to those skilled in the art.

A driver shaft 25 is positioned adjacent and parallel to shaft 22 and has mounted thereon a pinion 26 which is in engagement with gear 21. The result is that when the shaft 25 is rotated in either direction, by means to be later described, the gear 21 and hence the proper spindle will be driven to wind up the film. The shaft 25 has fixedly mounted thereon, a pair of discs 27 the inner peripheral edges of which are beveled as shown at 28. The discs are held in a fixed relation on shaft 25 by means of a suitable cylindrical spacer 29.

The projector frame is provided with an upstanding post 30, to the upper end of which is pivotally connected at 31 a bracket 32 to which an electric motor 33 is secured. The pivot point 31 is substantially on a vertical line through the center of gravity of the motor 33, the purpose of which arrangement will be later pointed out. The motor 33 is provided with a shaft 34 on which is mounted a drive roll 35 having a beveled end 36 positioned between and adapted to be moved selectively into driving relation with the beveled surfaces 28 of discs 27, see Figs. 2, 4 and 6, to connect the roller 35 to one of the spindles 13 or 14 to drive the connected spindle, as is deemed apparent. The motor shaft 34 also carries a cooling fan or propeller 59a, as best shown in Fig. 1.

As mentioned above, the motor-supporting bracket 32 is pivotally or rockably mounted about pivot point 31. Referring now to Figs. 2 and 4, it is apparent that if a clockwise rocking movement is imparted to bracket 32, the motor 33 will be moved to bring the rolls 35 into engagement with the right disc 27 to drive the latter as illustrated in Fig. 2. As the motor is thus tipped, it passes through its dead center position so that when the roller 35 engages the right disc 27, the motor will be positioned beyond its dead center position and will remain in that position until positively moved. When, however, a counter-clockwise rotation or rocking movement is imparted to bracket 32, and motor 33, the roller 35 will be moved out of engagement with the right disc 27, and will finally engage the left disc 27, as is deemed apparent. During the leftward or counter-clockwise movement, the roller 35 will again pass through the dead center, and will be positioned beyond said dead center when it finally engages the left disc 27. As the motor is beyond its dead center, the roller 35 will remain in engagement with the left disc 27.

It is thus apparent that by merely rocking the motor 33 in the proper direction, the roller 35 may be moved selectively into engagement with either of the discs 27. The arrangement of roller 35 and discs 27 is such that when the roller 35 is in driving relation with one disc, it will rotate the latter and hence shaft 25 and pinion 26 in one direction. Such rotation will cause gear 21 to rotate in such a direction as to connect one of the spindles 13 or 14 to gear 21 to drive the connected spindle, while the other spindle is disconnected and idles. However, when the motor is rocked in the other direction, the roller 35 will be moved into engagement with the other disc 27 to rotate shaft 25 and pinion 26 in the opposite direction. This will impart a reverse rotation to gear 21 to disconnect the previously connected spindle which now idles. Simultaneously, the other spindle is connected to gear 21 and is driven thereby. Thus, by rocking the motor in the proper direction, the selected spindle may be driven. Also, when the motor has been rocked to move the roller 35 into driving relation with one of the discs 27, the motor has been moved beyond its dead center position, and will remain in this position until the motor is rocked in the opposite direction by means to be presently described.

Figure 7:
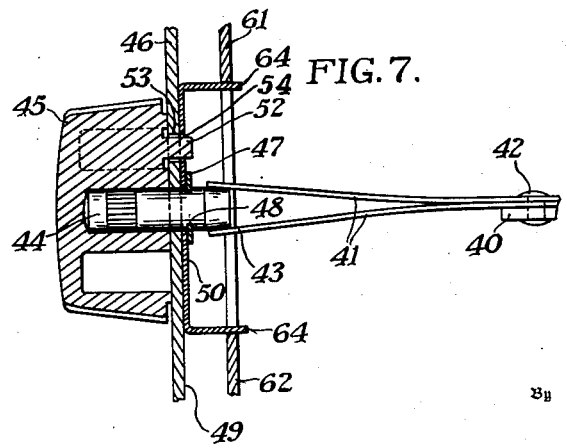
Fig. 7 is a partial sectional view, showing the cam in position to lock the motor against movement, and the means for connecting the cam to the knob pivot pin.

The motor bracket 32 is provided with a laterally projecting ear or lug 40 to which one end of a pair of flexible members or springs 41 is secured by a rivet 42 or other suitable fastening means. The free ends 43 of springs 41 straddle the pivot point or shaft 44 of an actuating knob 45 mounted on the plate 46. A snap spring or washer 47 engages in an annular slot 48 on 44 to hold the latter and knob 45 in place on plate 46, as best shown in Fig. 7. The pivot or shaft 44 has mounted thereon, between spring 47 and the inner surface 49 of plate 46, a cam 50 of the shape best shown in Fig. 8. This cam is formed with an opening 51 through which the shaft 44 extends. The knob 45 is provided with an axially extending finger 52 which extends through registering openings 53 and 54 in plate 46 and cam 50 respectively to connect the latter to knob 45 to rotate as a unit therewith.

The cam 50 is provided with an eccentrically-positioned, axially-extending lug or ear 55 which, when the knob 45 is in one position, Fig. 4, the lug 55 will be positioned as shown in Fig. 5, and the two springs 41 will rest on shaft 44, and the motor will be in its neutral or inoperative position with the roller 35 out of engagement with both discs 27, as shown in Fig. 4. However, when the knob 45 is turned to the position shown in Fig. 3, the lug 55 will be moved into engagement with and bend or flex the upper spring 41 to tension the latter. Such tensioning will provide sufficient force to rock bracket 32 and motor 33 in a clockwise direction about pivot point 31 to move roller 35 into driving relation with the right disc 27, as shown in Fig. 2. As the motor has been moved beyond its dead center, as mentioned above, the parts will remain in the position shown in Fig. 2 without the use of additional holding means. However, when the knob 45 has been moved 180° from the position shown in Fig. 3, the lug 55 will engage the lower spring 41 to flex and tension the latter. Such flexing or tensioning of the lower spring 41 will apply sufficient force to cause bracket 32 and motor 33 to pivot in a counter-clockwise direction, as viewed in Figs. 2 and 4, to move the roller 35 into driving relation with the left disc 27 to drive the other reel. In this position the motor has been moved past its vertical dead center and will remain in that position until positively moved. Thus the motor may be positioned to move the roller 35 selectively into driving engagement with either of the discs 27. The particular disc engaged depends on the direction of rocking of the motor. Such rocking is secured by means of knob 45 and cam 50 cooperating with the pair of springs 41.

Figure 8:
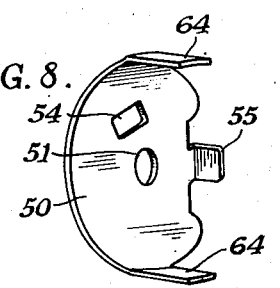
Fig. 8 is a perspective view of the operating cam.

In order to prevent the motor 33 from moving during shipping and/or handling, an interlock is provided to maintain the motor 33 and roller 35 in their neutral or inoperative position. To secure this result, the motor bracket 32 is formed with a bifurcated bracket plate 60 formed with spaced members 61 and 62 positioned on opposite sides of but radially from the cam 50, as best shown in Figs. 3 and 5. The plate 60 is connected to bracket 32 by a curved plate 63. The cam 50 is formed with a pair of diametrically arranged axially extending lugs 64 which are spaced 90° from the lug 55, as shown in Figs. 3, 5 and 8. To lock the motor against movement, the cam 50 is turned to its position shown in Figs. 4, 5 and 7 to move the lugs 64 into engagement with the legs or portions 61 and 62 of bracket 32 to hold the motor positively in its central or neutral position as illustrated in Fig. 4.

The present invention thus provides a drive means which may be easily, quickly, and selectively connected to either reel spindle to drive one of the spindles only, the other spindle being disconnected from the drive means and idles. An effective interlock is provided for moving and retaining the drive means in its disconnected and inoperative position during shipping and/or handling.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the appended claims.

What I claim and desire to secure by Letters Patent of the United States is:

1. In a film-feeding mechanism, a pair of film reels, a pair of aligned discs each of which is operatively connected to one of said reels, said discs being adapted to be rotated in opposite directions to drive said reels selectively, a drive motor, a drive roller, means for rockably mounting said motor to move said roller selectively into engagement with one of said discs to drive one of said reels, a manually actuated control knob, a pair of flexible members connected to said motor, and means on said knob engageable selectively with one of said members to flex said one member to rock said motor to move said roller selectively into engagement with one of said discs to drive one of said reels.

2. In a film-feeding mechanism, a pair of film reels, a pair of aligned discs each of which is operatively connected to said reels, said discs being adapted to be rotated in opposite directions to drive said reels selectively, a drive motor, a drive roller, means for rockably mounting said motor to move said roller selectively into engagement with one of said discs to drive one of said reels, a manually actuated control knob, a pair of flexible cantilever members connected at one end to said motor, and operating means on said knob positioned between said members at the opposite end thereof so that rotation of said knob will bring said operating means into engagement with one of said members to tension the latter to rock said motor in one direction to move said roller into engagement with one of said discs to drive one of said reels.

3. In a film-feeding mechanism, a pair of film reels, a pair of aligned discs each of which is operatively connected to said reels, said discs being adapted to be rotated in opposite direction to drive said reels selectively, a drive motor, a drive roller, means for rockably mounting said motor to move said roller selectively into engagement with one of said discs to drive one of said reels, a manually actuated control knob, a pair of flexible cantilever members having one end of each member connected to said motor adjacent the rocking point of said motor, and a lug on said knob movable selectively into engagement with either of said members to tension the engaged member to rock said motor in one direction about said point to move said roller into engagement with one of said discs to connect one of said reels to drive the latter, said knob being movable to disconnect said lug from said first-engaged member and into engagement with the other member to rock said motor in another direction to move said roller into engagement with the other disc to drive the reel associated therewith.

4. In a film-feeding mechanism, a pair of film reels, a pair of spaced aligned discs, one of said discs being connected operatively to one reel while the other disc is connected to the other reel, a motor, a drive roller connected to said motor and movable selectively into driving relation with one of said discs to drive the reel connected thereto, a frame for supporting said motor, means for pivotally mounting said motor substantially through its center of gravity, a pair of cantilever springs connected at one end to said support adjacent said center, a manually operative control knob, and a lug on said knob positioned between said springs and movable selectively into engagement with one of said springs to tension the engaged spring to rock said motor about said center to move said roller into driving relation with one of said discs.

5. In a film-feeding mechanism, a pair of film reels, a pair of spaced aligned discs, one of said discs being connected operatively to one reel while the other disc is connected to the other reel, a motor, a drive roller connected to said motor and movable selectively into driving relation with one of said discs to drive the reel connected thereto, a frame for supporting said motor, means for pivotally mounting said motor substantially through its center of gravity, a pair of cantilever springs connected at one end to said support adjacent said center, a manually operative control knob, a lug on said knob positioned between said springs and movable selectively into engagement with one of said springs to tension the engaged spring to rock said motor about said center to move said roller into driving relation with one of said discs, and a pair of diametrically arranged lugs connected to said knob and movable to engage said frame to lock said motor against movement about said center.

References Cited in the file of this patent

UNITED STATES PATENTS

| Number | Name | Date |
|---|---|---|
| 773,985 | Ries | Nov. 1, 1904 |
| 1,144,673 | Wheeler | June 29, 1915 |
| 2,468,453 | Mallentjer | Apr. 26, 1949 |
| 2,537,260 | Dale | Jan. 9, 1951 |